ately produced or allowed by the examiner. The ill-United States Patent [19]
Mooney

[11] 3,817,087
[45] June 18, 1974

[54] APPARATUS FOR DETECTING AND INDICATING LEAKS IN A FLUID SYSTEM
[76] Inventor: Joseph R. Mooney, 40 Killdeer St., New Orleans, La. 70124
[22] Filed: Oct. 6, 1972
[21] Appl. No.: 295,609

[52] U.S. Cl............................................. 73/40.5 R
[51] Int. Cl.......................... G01m 3/04, F17d 3/04
[58] Field of Search........................... 73/40.5 R, 40

[56] References Cited
UNITED STATES PATENTS
| | | | |
|---|---|---|---|
| 2,952,387 | 9/1960 | Fowler et al. | 73/40.5 R X |
| 2,952,388 | 9/1960 | Deters | 73/40.5 R X |
| 2,952,389 | 9/1960 | Fowler et al. | 73/40 X |
| 2,952,390 | 9/1960 | Fowler et al. | 73/40 X |
| 2,979,939 | 4/1961 | Shuh | 73/40.5 R X |
| 3,183,723 | 5/1965 | Deters | 73/40.5 R |
| 3,273,753 | 9/1966 | Johnson et al. | 73/40.5 R X |
| 3,439,837 | 4/1969 | Hearn et al. | 73/40.5 R X |
| 3,454,195 | 7/1969 | Deters | 73/40.5 R X |

Primary Examiner—Richard C. Queisser
Assistant Examiner—Joseph W. Roskos
Attorney, Agent, or Firm—John R. Walker, III

[57] ABSTRACT

Apparatus for detecting and indicating leaks in a fluid system having a fluid line, an outlet valve on the fluid line, and a pump connected to the fluid line for causing fluid to flow therethrough. The apparatus includes a bypass passageway which is adapted to bypass fluid around a check valve disposed in the fluid line. The apparatus utilizes a time delay interval between the starting of the pump and the opening of the outlet valve to determine if there is a leak. In one form of the apparatus, a blocking element is actuated by flow through the bypass passageway and swings out over the top of the check valve to limit movement thereof so that when the outlet valve is subsequently opened, flow will be reduced therethrough, indicating that there is a leak. In another form, the flow through the bypass passageway during said time delay interval is indicated by a visual or other type indicator.

11 Claims, 5 Drawing Figures

PATENTED JUN 18 1974 3,817,087
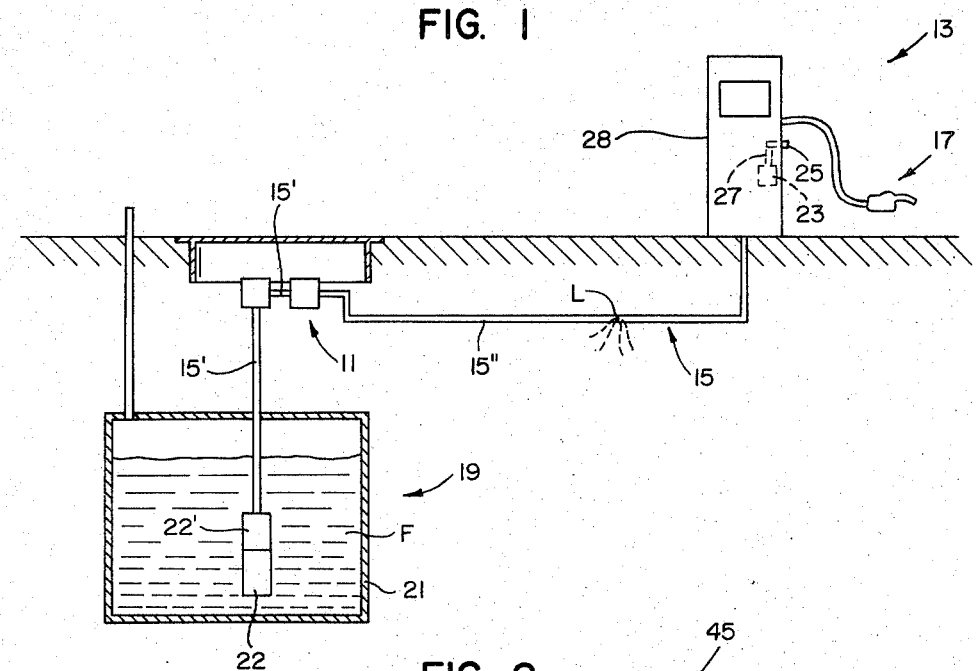
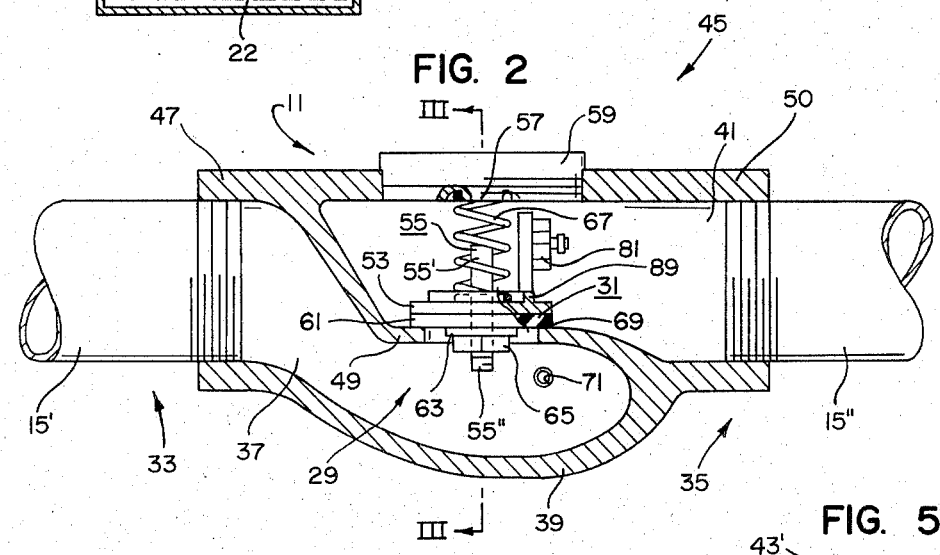
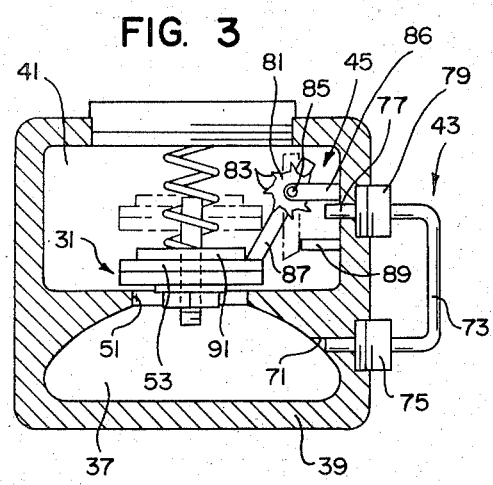
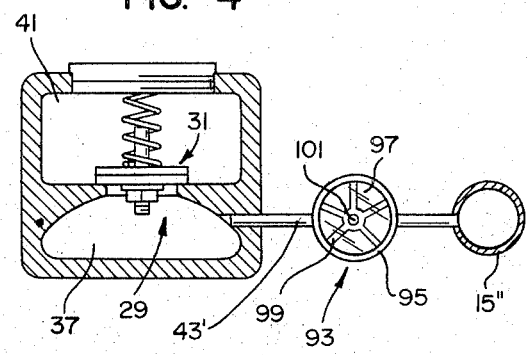
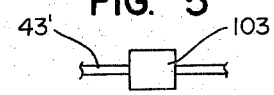

APPARATUS FOR DETECTING AND INDICATING LEAKS IN A FLUID SYSTEM

BACKGROUND OF THE INVENTION

1. Field of the Invention

This invention relates to apparatus for detecting and indicating leaks in a fluid system.

2. Background of the Invention

A patent search disclosed the following U.S. patents: Ray U.S. Pat. No. 3,575,197; Miller U.S. Pat. No. 451,129; and Brown U.S. Pat. No. 1,788,368. Also, applicant has knowledge of the following U.S. patents: Deters U.S. Pat. No. 2,952,388; Fowler et al. U.S. Pat. No. 2,952,390; Deters U.S. Pat. No. 3,545,195; Fowler et al. U.S. Pat. No. 2,952,389; and Fowler U.S. Pat. No. 2,952,387.

Brown '368 U.S. Pat. discloses a valve which is automatically shut when there is a breakage in the pipeline by impulsive action of the gas acting against a set of wings which causes retraction of a bolt to release the valve element that is moved into a closed position by a spring. The set of wings is disposed in the main fluid flow passageway of the gas.

Miller U.S. Pat. No. '129 discloses a measuring device for fluid in which the fluid acts against an assembly of bucketlike members that are rotated in accordance with the fluid flow to cause actuation of a tripping device to stop flow of fluid through the faucet when the desired quantity of fluid has been dispensed.

The Ray '197 U.S. Pat. discloses a valve leak detector to shut off the valve to the burner of a gas furnace. The valve has two seats, and these are provided to detect gas leakage into the space between the seats. A pressure switch is actuated to prevent main burner ignition if a gas leak is detected.

The above-mentioned Fowler et al. U.S. Pat. Nos., '387, '389, '390 and Deters U.S. Pat. No. '195 and '388 are leak detecting apparatus for detecting leaks in a supply line through which fluid is intermittently delivered. All the devices in these patents operate on the principle of a chamber receiving a charge of liquid from the pump when the pump is operated and deliverance of this charge of liquid back to the main line after the pump is stopped. Also, there is a means for maintaining the liquid in the chamber under pressure to force the liquid from the chamber to the line.

Also, applicant has knowledge of other devices which operate on a "pressure actuated" principle. In these types of systems, if, because of leakage, the system cannot develop sufficient pressure against a diaphragm to open the valve fully, the flow is throttled to a "signal" rate, indicating trouble in the system.

In addition, applicant has knowledge of another so-called "Buckeye" device, which is a pressure-sensing device. Full operating flow tends to close the valve poppet. Force against the diaphragm is used to overcome spring action. There is a bypass around the product which is used to transmit pressure; the bypass inlet is on the "closed" side of the poppet, rather than on the "open" side. Pressure on the inlet side of a valve tends to close the poppet.

None of the above-mentioned patents or devices known by applicant disclose or suggest applicant's unique concept, as will be more fully understood hereinafter.

Also, many of the prior devices have disadvantages, among them being the following: (1) Close clearances in some of the devices, resulting in clogging, jamming, or sluggish operation due to product solid components or impurities collecting in the areas of close clearances; (2) High machine costs in the manufacture of some of the previous devices; (3) Problems resulting from diaphragms in some of the devices wearing out due to flexing or from being damaged by the product itself or additives in the product; (4) some of the devices have the objection from the environmental pollution and safety standpoint that the top of the diaphragm is open to atmospheric pressure. For safety sake, it is necessary to pipe from the top of the diaphragm back to the vapor area and the storage tank. (5) The floating piston of one of the devices is subject to being moved by external vibrations, giving false indications of a leak. (6) Some of the devices are difficult to re-set. (7) With devices utilizing diaphragms, a ruptured diaphragm can be extremely hazardous.

SUMMARY OF THE PRESENT INVENTION

The present invention is directed towards overcoming the above-mentioned and other problems in leak detecting apparatus. These problems are overcome by the present invention in a very simple, inexpensive and highly effective manner. The concept of the present invention is to test for a leak or no-leak condition by the presence or absence of a bypass or leakage flow around a valve in the main line of the system and which flow is in the same direction as the normal flow through the system. The means by which the above-mentioned concept is carried out is to provide an apparatus which includes a bypass passageway that is adapted to bypass fluid around a valve disposed in the fluid line. The apparatus in one form of the invention utilizes a time delay interval between the starting of the fluid system pump and the opening of the outlet valve of the fluid line to determine if there is a leak. In one embodiment of the apparatus, a blocking element is actuated by flow through the bypass passageway during the above-mentioned time delay interval and swings out over the top of the valve to limit movement thereof so that when the outlet valve is subsequently opened, flow will be reduced therethrough indicating that there is a leak. In another form, flow through the bypass is indicated by an indicator such as a visual or other type of indicator.

More specifically, the apparatus of the present invention is adapted to be utilized in a fluid system having a fluid line, having an outlet valve on the fluid line, and having pressure source means, such as a pump or a head of liquid in an elevated tank. The apparatus of the present invention is interposed in the above-mentioned fluid line intermediate the pressure source means and the outlet valve. The apparatus comprises a valve which includes a valve member dividing the system into an upstream portion and a downstream portion. The valve member is movable between a closed position for stopping the flow through the valve and an open position for permitting normal flow through the valve towards the outlet valve. Additionally, the apparatus includes a bypass passageway extending from the above-mentioned upstream portion to the downstream portion for bypassing fluid therethrough to provide a bypass fluid flow during a first condition of the fluid system in which the valve and the outlet valve are closed, the fluid pressure source means is causing pressure in the system and a leak exists in the downstream portion. Additionally, indicating means is operably coupled to the bypass passageway and actuated in response to the bypass fluid flow during the existence of the above-mentioned first condition to indicate leakage in the fluid system in the downstream portion.

BRIEF DESCRIPTION OF THE DRAWING

FIG. 1 is a somewhat schematic view showing the concept of the present invention in conjunction with a service station.

FIG. 2 is a vertical cross sectional view through the longitudinal centerline of the apparatus of the present invention.

FIG. 3 is a sectional view taken as on the line III—III of FIG. 2.

FIG. 4 is a view similar to FIG. 3 of an alternate embodiment of the present invention.

FIG. 5 is a schematic view of an alternate indicator.

DESCRIPTION OF THE PREFERRED EMBODIMENT

The apparatus 11 of the present invention is adapted to be used in conjunction with a fluid system, as for example, the fluid system which is illustrated in FIG. 1 as a service station fluid system 13 having a fluid line 15, having a discharge or outlet valve 17 and having a fluid pressure source 19, which typically in a service station 13 includes an underground tank 21 in which the fluid F, in the form of gasoline, is contained and is caused to flow under pressure under normal conditions through fluid line 15 and out outlet valve 17, when the valve is opened. Suitable means, such as pump control switch 23, is provided for stopping and starting the electrical motor 22' of the pump 22, which is connected thereto through the usual conduits, electrical power source, etc., not shown, but well known to those skilled in the art. Thus, the typical lever 25 which actuates switch 23 through a suitable linkage 27 causes the pump 22 to stop when the outlet valve 17 is in its normal stored position (not shown) on pedestal 28 in engaged relationship with lever 25, and when the outlet valve 17 is disengaged from the pedestal 28 ready to service an automobile, as shown in FIG. 1, motor 22 will be started upon disengagement of the outlet valve with the lever 25. It will be understood that the above-described service station 13 is well known to those skilled in the art and other fluid systems may be used in conjunction with the present invention without departing from the spirit and scope thereof.

Referring now first to the preferred embodiment of the present invention, best shown in FIGS. 1, 2 and 3, the apparatus 11 of the present invention is interposed in fluid line 15 intermediate pump 22 and outlet valve 17. Apparatus 11 includes, in general, a valve 29 including a valve member 31 dividing system 13 into an upstream portion 33 and a downstream portion 35. The upstream portion 33 shall be deemed to include the fluid passageway upstream of valve member 31, including upstream chamber 37 provided in casing 39 of valve 29, upstream portion 15' of fluid line 15 and any other related fluid passageway between pump 22 and valve member 31. Downstream portion 35 shall be deemed to include downstream chamber 41 in casing 39, downstream portion 15'' of fluid line 15, and any other fluid passageway between valve member 31 and outlet valve 17. Also, in general, apparatus 11 includes a bypass passageway 43 extending from upstream portion 33 to downstream portion 35 to provide a bypass fluid flow when a leak, such as leak L exists in downstream portion 35, as will be better understood in the description to follow later. If desired, bypass passageway means 43 may be formed internally, i.e., as a part of casing 39 rather than as a separate external component, without departing from the spirit and scope of the present invention. Additionally, apparatus 11 includes, in general, indicator means 45 operably coupled to bypass passageway 43 and actuated in response to the abovementioned bypass fluid flow to indicate leakage in the downstream portion 35 of fluid system 13.

Referring now more specifically to the construction of apparatus 11, valve 29 is preferably a flow responsive valve such as a swing check valve, or the poppet valve best shown in FIGS. 2 and 3, but may be of other types such as a manually controlled globe valve for testing the system for leaks in a manner yet to be disclosed. Thus, in the form shown in FIGS. 2 and 3, valve 29 has an inlet portion 47 attached to upstream portion 15', as by threading, so that under normal flow conditions fluid from pump 22 enters upstream chamber 37. A partition 49, which is part of casing 39, separates upstream chamber 37 and downstream chamber 41. An opening 51 is provided in partition 49 to communicate upstream chamber 37 with downstream chamber 41. An outlet portion 50 of valve 29 is attached to downstream portion 15''. as by threading.

Valve member 31 is movable between a closed position shown in solid lines in FIG. 2 for stopping the flow through valve 29 and an open position shown in broken lines in FIG. 3 for permitting normal flow through valve 29 and portion 35 towards outlet valve 17. Valve member 31 includes a circular disk retainer 53 and a stem 55 preferably integrally formed with retainer 53 and extending axially thereof. The upper portion 55' of stem 55 engages the central portion 57 of a plug 59 threadedly engaged in casing 39. Engagement of upper portion 55' with central portion 57 limits upward movement of valve member 31 to stop it in said open position. Valve member 31 also includes a disk 61 which fits below disk retainer 53 with the lower portion 55' of stem 55 extending through a central opening in the disk. The lower portion 55'' is threaded and has a washerlike lower disk retainer 63 that fits below disk 61. Below lower disk retainer 63 is a nut 65 which is threaded onto lower portion 55'' and holds the parts of valve member 31 together in assembled relationship, as best seen in FIGS. 2 and 3.

A coiled spring 67, having its upper end seated around central portion 57 and its lower end seated against the top of upper disk retainer 53, urges valve member 31 downwardly to said closed position in which disk 61 is seated on the annular valve seat 69 to stop flow through opening 51.

Bypass passageway 43 includes a bore 71 through casing 39 and leading outwardly from upstream chamber 37, tubing 73 mounted at one end to casing 39 by a compression fitting 75 of known construction threaded into the casing and communicating the end of the tube with bore 71, and the other end of the tube being communicated with downstream chamber 41 by a sleevelike nozzle member 77 which extends through the casing and is threaded into a compression fitting 79 into which extends the end of tubing 73 so that bypass flow is provided from upstream chamber 37 to downstream chamber 41.

Indicating means 45, which indicates said bypass fluid flow through bypass passageway 43 and is operably coupled thereto, is described as follows:

An impulse wheel 81, similar to a so-called "Pelton water wheel," having bucketlike members 83 extending outwardly around the periphery thereof and disposed in the path of the bypass fluid flow from nozzle member 77, is turnably mounted in downstream chamber 41 on a shaft 85 mounted in turn from casing 39 as by a support 86, so that if there is a bypass flow, it will cause impulse wheel 81 to turn in a clockwise direction as viewed in FIG. 3. A lever or blocking member 87 is fixedly attached to wheel 81 and extends downwardly and outwardly therefrom so that if there is no flow through bypass passageway 43, blocking member 87 will remain in a normal vertical position shown in broken lines in FIG. 3 in unobstructing relationship relative to valve member 31. It will be understood that gravity will cause blocking member 87 to assume the above-mentioned normal position. Also, it will be noted that a stop 89 prevents any suitable substantial counterclockwise movement of wheel 81 and blocking member 87 beyond the normal position. However, when there is a flow through bypass passageway 43, wheel 81 will be urged clockwise, as heretofore described, and if this movement takes place when valve member 31 is still in the closed position, the lower end of blocking member 87 will move out above valve member 31 and block upward movements thereof. This blocking position is shown in solid lines in FIG. 3 and there is preferably an upstanding ringlike stop member 91 integrally formed on the top of upper disk retainer 53 to limit clockwise movement of blocking member 87 and stop it in said blocking position. Said blocking position preferably is a partially open position of valve 29, that is, valve member 31 will rise a short distance from its closed position before it engages blocking member 89 to stop it in the partially open position, shown in solid lines in FIG. 3.

In describing the operation of the present invention, it is assumed that to begin with the system 13 is in an "at rest" condition in which dispensing valve 17 is positioned on pedestal 28, pump 22 is not operating, there is gasoline in tank 21, fluid line 15 is full or almost full, and valves 17 and 29 are closed. Also, it should be noted that occasionally a small vapor space exists in system 13 due to shrinkage of the gasoline caused by temperature drop thereof.

I. No leak condition — When there is no leak in the system, the sequence of events is as follows:

1. The operator removes dispensing valve 17 from pedestal 28 which starts pump 22 in a manner heretofore described.

2. If there is a small vapor space, it is quickly filled and valve member 31 moves to the open position to allow passage of gasoline. The flow through bypass passageway 43 impinges against impulse wheel 81, but, because of inertia, it does not move towards valve member 31 in time to be positioned over the valve member 31 and block its rise.

3. When the vapor space is filled (1/10 second up to 2 seconds), pressure in equalized and valve member 31 is forced back onto its seat 69.

4. There is then no flow through bypass passageway 43. Therefore, blocking member 87 rests against the stop 89.

5. The operator next opens dispenser valve 17 (in most service station applications this occurs approximately five seconds after the pump 22 has been turned on). Valve member 31 is forced from valve seat 69 to said open position, shown in broken lines in FIG. 3, to allow normal full fluid flow through the system and out valve member 17, which indicates to the operator that there is no leak in the system. It will be understood that there is flow through bypass passageway 43 tending to force wheel 81 clockwise but because of the immediate flow through valve 29, blocking member 87 will not move out in time to block valve member 31. Thus, there is normal flow which indicates no leak, as above described.

II. Leak Condition — When there is a leak in the system (assume, for example, a leak of ½ gallon per hour or more at 25 PSI, the usual pump pressure developed when the service station dispenser valve 17 is closed), the following sequence of events occurs:

1. The operator removes the dispenser valve 17 from the pedestal 28 which starts pump 22 in a manner heretofore described. The pressure opens valve member 31 and the flow fills fluid line 15, which probably had a small vapor space in it due to leakage. Also, some additional vapor space might have been present due to shrinkage of product. The fluid line 15 is quickly filled and valve member 31 is forced back onto its seat 69.

2. Because of a leak in the system, the fluid continues to flow through bypass passageway 43.

3. The blocking member 87, under the influence of the bypass fluid flow, moves into the blocking position shown in solid lines in FIG. 3.

4. The operator opens the dispenser valve 17 after a time delay interval which is, for example, 5 seconds after pump 22 has been started. Due to the blocking member 87 being in the blocking position, valve member 31 is restricted in its movement to the partially opened position shown in full lines in FIG. 3. Therefore, the flow from dispensing valve 17 is restricted and this signals to the operator that there is a leak.

For a better understanding of the present invention, some specific examples of flow rates, etc., are as follows:

Bypass passageway 43 is preferably sized so that flows up to some specific rate, for example, 2 gallons per hour, will not exceed the pressure drop needed to open valve member 31. As an example, pressure required to open the valve member 31 can be set at 3 PSI, and bypass passageway 43 sized so that the pressure drop across it at a flow of 2 gallons per hour will be 3 PSI. Thus, using these specific figures, if a leak exceeds 2 gallons per hour, then valve member 31 will be forced open (but no further than the partially open position due to the blocking member 87) to allow passage of some of the fluid, the rest going through bypass passageway 43. Also, it should be pointed out that the blocking member 87, when in the blocking position, allows 3 gallons per minute of product to be delivered. Thus, the leak detecting and flow restricting capability of apparatus 11, with these specific opening sizes, would be up to just under 3 gallons per minute. Such a large leak would be easily detected in other ways (air in the lines, water seeping into the lines, inventory control systems, loss of pressure, etc.). Smaller leaks, for example, those ranging from approximately 1 gallon per hour and up to 5 gallons per hour are the ones which are most difficult to detect by the above-mentioned means but are easily detected with the present invention.

From the foregiong, it is apparent that the apparatus 11 of the present invention utilizes the leakage flow, which is in the same direction as the main flow, which is a restricted flow, and which is less than that required to open valve member 31. Also, the present invention utilizes the time delay interval between the starting of the pump and the opening of the dispensing valve for detecting a leak by means of the leakage bypass. This is in contrast to many of the previous devices which operates on the principle of receiving a charge of liquid from the pump when it is operated and then delivering this charge of liquid back to the line after the pump is stopped, which principle requires more moving parts, diaphragms and the like. The device of the present invention is simple to machine with no close fitting of the critical parts. The impulse wheel 81 fits loosely on shaft 85. The tube 73 is relatively "wide open" and may be protected against clogging as by a screen, not shown. Using a 3/32 inch diameter orifice, for example, the velocity of flow for a ½ gallon per hour leak would be approximately 4½ inches per second, a more than adequate rate for driving the impulse wheel 81 in the process of detecting a leak.

The lack of the necessity for close fitting parts in the present invention is in comparison with some of the other prior devices in which the clearances are extremely close. Product additives and solid precipitates, varnish and gum and gasoline, dirt, etc., cause malfunctioning. Also, in those devices which have diaphragms, they are particularly vulnerable to attack by additives in the product and are subject to normal wear and tear caused by flexing. In other devices in which there are floating pistons and cylinder assemblies, this makes machining costly and these parts vulnerable to jamming, sticking, and other malfunctioning.

Also, in the area of "resetting," the present invention has advantages over previous devices. Thus, it is rarely necessary to reset the apparatus of the present invention. It is simple and quick and there are no close clearances to become clogged. This is in comparison to some of the previous devices in which false indications of leaks are caused by jamming due to foreign matter getting into the closely machined spaces. Then, it cannot be reset. Also, in some devices it is necessary to reset every time the pressure in the system drops to zero. This occurs frequently in service stations during cold weather. Relatively warmer gasoline from underground tanks quickly cools off in pipelines and contracts, and the pressure drops to zero. Resetting is time-consuming, requiring approximately 1 minute. It may take longer, or be impossible, if the needle valve is partially or completely clogged.

In the embodiment shown in FIG. 4, rather than the indicating means being one which gives a reduced flow at dispensing valve 17, as in the principal embodiment heretofore described, the indicating means 93 is a visual indicator of suitable type such as that shown in FIG. 4 in which a circular casing 95 is provided having a clear side 97 of glass, or the like, and a propeller 99 rotatably mounted in the casing on a shaft 101. With indicating means 93, the bypass passageway 43', rather than being returned to downstream chamber 41, is returned to the downstream portion 15" of line 15. It will be understood that indicating means 93 is interposed in bypass passageway 43' so that bypass fluid will cause propeller 99 to rotate and indicate a leak during the conditions heretofore described. It will be understood that with the embodiment shown in FIG. 4, impulse wheel 18 and the related parts are omitted.

Also, it will be understood that other indicating means well known to those skilled in the art may be provided in place of indicating means 93, as for example, fluid flow audio indicating means 103, well known to those skilled in the art, may be disposed in bypass passageway 43' so that when there is flow through the bypass passageway, indicating means 103 will provide an audible sound.

In addition, it will be understood that when testing manually, as with a manually controlled valve, not shown, such as a well known globe valve, in place of valve 29, then the globe valve is closed off as well as valve 17 and indicator means 93 or 103 will indicate whether or not there is a leak.

Although the invention has been described and illustrated with respect to preferred embodiments, it will be understood that it is not to be so limited since changes and modifications may be made therein which are within the full intended scope of this invention.

I claim:

1. In a fluid system having a fluid line, having an outlet valve means on said fluid line, and having pressure source means connected to said fluid line for causing fluid to flow therethrough; apparatus interposed in said fluid line intermediate said pressure source means and said outlet valve means for detecting and indicating leakage in said fluid system; said apparatus comprising valve means including valve member means dividing said system into an upstream portion and a downstream portion, said valve member means being movable between a closed position for stopping the flow through said valve means and an open position for permitting normal flow through said valve means and said fluid line towards said outlet valve means; bypass passageway means extending from said upstream portion to said downstream portion for bypassing fluid therethrough to provide a bypass fluid flow during a first condition of said fluid system in which said valve means and said outlet valve means are closed, said pressure source means causing fluid to flow and a leak exists in said downstream portion; and indicating means operably coupled to said bypass passageway means and actuated in response to said bypass fluid flow during the existence of said first condition to indicate leakage in said downstream portion.

2. The fluid system of claim 1 in which said indicating means includes visual indicating means.

3. The fluid system of claim 1 in which said indicating means includes blocking means actuated in response to said bypass fluid flow for preventing movement of said valve member means to said open position and thereby full flow is prevented when subsequent to said first condition, a second condition of said fluid system exists in which said outlet valve means is opened and said fluid pressure source is causing fluid to flow.

4. The fluid system of claim 3 in which said movement of said valve member means is limited by said blocking means during said second condition to a partially open position.

5. The fluid system of claim 4 in which said bypass passageway means is reduced in size relative to said fluid line.

6. The fluid system of claim 1 in which said indicating means includes casing means interposed in said bypass passageway means whereby said bypass fluid flow passes therethrough, said casing means including a clear side, propeller means rotatably mounted in said casing means and being disposed therein so as to be visible through said clear side, and said propeller means being rotated by said bypass fluid flow whereby rotation of said propeller means visually indicates a leak in the fluid system.

7. In a fluid system having a fluid line, having an outlet valve means on said fluid line, and having pressure source means connected to said fluid line for causing fluid to flow therethrough, said pressure source means being started prior to opening of said outlet valve means to provide a time delay interval, opening of said outlet valve means after said time delay interval when there is no leak in said system being normally effective to cause normal flow from said fluid line out through said outlet valve means; apparatus interposed in said fluid line intermediate said pressure source means and said outlet means for detecting and indicating leakage in said fluid system, said apparatus comprising valve means including valve member means dividing said system into an upstream portion and a downstream portion; said valve member means being movable between a closed position for stopping the flow through said valve means and an open position for permitting normal flow through said valve means, said fluid line and out said outlet valve means; said valve member means being normally movable to said open position under influence of normal flow in said fluid system and said valve means including means for moving said valve member means to said closed position when said outlet valve means is closed and the flow is not normal in said fluid system; bypass passageway means extending from said upstream portion to said downstream portion for bypassing fluid therethrough to provide a bypass fluid flow during said time delay interval when a leak exists in said downstream portion, and blocking means normally positioned in unobstructing relationship relative to said valve member means for permitting normal flow through said valve means, said fluid line and out said outlet valve means when said outlet valve means is opened subsequent to said time delay interval if there has been no leak in said downstream portion during said time delay interval, and operably coupled to said bypass passageway for movement into a blocking position relative to said valve member means during said time delay interval in response to said bypass flow when a leak exists in said downstream portion to prevent said valve member means from moving to said open position.

8. The fluid system of claim 7 in which said blocking means comprises an impulse wheel disposed in the outlet flow path from said bypass passageway means into said downstream portion, and a blocking member fixedly attached to said impulse wheel for movement between said unobstructing relationship and said blocking position.

9. The fluid system of claim 8 in which said bypass passageway means is reduced in size relative to said fluid line.

10. In a fluid system having a fluid line, having an outlet valve means on said fluid line, having pressure source means connected to said fluid line for causing fluid to flow therethrough, said pressure source means being started prior to opening of said outlet valve means to provide a time delay interval, and opening of said outlet valve means after said time delay interval being effective to cause normal flow from said fluid line out through said outlet valve means; apparatus interposed in said fluid line intermediate said pressure source means and said outlet means for detecting and indicating leakage in said fluid system, said apparatus comprising valve means including valve member means dividing said system into an upstream portion and a downstream portion; said valve member means being movable between a closed position for stopping the flow through said valve means and an open position for permitting normal flow through said valve means, said fluid line, and out said outlet valve means; said valve member means being normally movable to said open position under influence of normal flow in said fluid system and said valve means including means for moving said valve member means to said closed position when said outlet valve means is closed or when the flow is minimal in said fluid system, bypass passageway means extending from said upstream portion to said downstream portion for bypassing fluid therethrough to provide a bypass fluid flow during said time delay interval when a leak exists in said downstream portion, and means responsive to said bypass fluid flow during said time delay interval for visually indicating an operative status thereof which may readily be construed as a leak in the fluid system.

11. In a fluid system having a fluid line, having an outlet valve means on said fluid line, and having pressure source means connected to said fluid line for causing fluid to flow therethrough, said pressure source means being started prior to opening of said outlet valve means to provide a time delay interval, and opening of said outlet valve means after said time delay interval being effective to cause normal flow from said fluid line out through said outlet valve means; apparatus interposed in said fluid line intermediate said pressure source means and said outlet means for detecting and visually indicating leakage in said fluid system, said apparatus comprising valve means including valve member means dividing said system into an upstream portion and a downstream portion; said valve member means being movable between a closed position for stopping the flow through said valve means and an open position for permitting normal flow through said valve means, said fluid line, and out said outlet valve means; said valve member means being normally movable to said open position under influence of normal flow in said fluid system and said valve means including means for moving said valve member means to said closed position when said outlet valve means is closed or when the flow is minimal in said fluid system bypass passageway means extending from said upstream portion to said downstream portion for bypassing fluid therethrough to provide a bypass fluid flow during said time delay interval when a leak exists in said downstream portion, casing means interposed in said bypass passageway means whereby said bypass fluid flow passes therethrough, said casing means including a clear side, and propeller means rotatably mounted in said casing means and being disposed therein so as to be visible through said clear side; said propeller means being rotated by said bypass fluid flow whereby prolonged rotation of said propeller means during said time delay visually indicates a leak in the fluid system.

* * * * *